United States Patent
Castle

(10) Patent No.: US 6,312,162 B1
(45) Date of Patent: Nov. 6, 2001

(54) ADJUSTABLE BEARING SPACER

(76) Inventor: Noel Castle, 225 Doghill Rd., Baldivis, WA (US) 06171

( * ) Notice: Subject to any disclaimer, the term of this patent is extended or adjusted under 35 U.S.C. 154(b) by 0 days.

(21) Appl. No.: 09/446,757

(22) PCT Filed: Jun. 18, 1998

(86) PCT No.: PCT/AU98/00471

§ 371 Date: Dec. 23, 1999

§ 102(e) Date: Dec. 23, 1999

(87) PCT Pub. No.: WO98/59180

PCT Pub. Date: Dec. 30, 1998

(30) Foreign Application Priority Data

Jun. 24, 1997 (AU) .................................................. PO7524

(51) Int. Cl.⁷ .............................. F16C 25/06; F16C 23/06
(52) U.S. Cl. ........................ 384/551; 384/500; 384/519; 384/540; 384/562; 384/583
(58) Field of Search ........................................ 384/500, 504, 384/517, 519, 520, 540, 544, 551, 562, 563, 583, 589, 626

(56) References Cited

U.S. PATENT DOCUMENTS

| | | | |
|---|---|---|---|
| 1,266,310 | * 5/1918 | Pfanstiehl | 384/583 |
| 2,188,251 | * 1/1940 | Nelson | 384/517 |
| 2,407,532 | 9/1946 | Boden | 384/582 |
| 4,651,590 | 3/1987 | Thun | 384/458 X |
| 4,657,412 | 4/1987 | McLarty et al. | 384/447 |
| 4,738,551 | * 4/1988 | Chi | 384/519 |
| 4,984,910 | * 1/1991 | Cogno | 384/563 |
| 5,211,487 | 5/1993 | Hannon et al. | 384/562 |

FOREIGN PATENT DOCUMENTS

| | | |
|---|---|---|
| 6906343 | 7/1969 | (DE) . |
| 0049788 A2 | 4/1982 | (EP) . |
| 0126607 A2 | 11/1984 | (EP) . |

* cited by examiner

*Primary Examiner*—Thomas R. Hannon
(74) *Attorney, Agent, or Firm*—Pearne & Gordon LLP

(57) ABSTRACT

An adjustable bearing spacer (12) includes a cylindrical outer body (42) having a first end (44) for abutment with a bearing cone (28) disposed within one end of a hub (10) and an adjustable ring (46) for abutment with an opposite bearing cone (30). The ring (46) is threadingly engaged with the outer body (42) so as to be extendable from an end (48) of the body (42) allowing adjustment of the length of the spacer (12). End (48) is provided with a plurality of evenly-spaced markings. Two of these markings are in the form of small holes into which the prongs of a tool can be inserted. End (58) of ring (46) is also provided with markings in the form of holes into which the prongs of a tool can be inserted. The markings form an indexing scale for providing an indication of the extension in the length of the spacer (12) when the ring (46) is screwed in or out. The degree of extension is calculated as follows $E^{11}=1/x.z/y$ where X equals the number of threads per unit length on ring (46); Y equals the number of markings on the outer body (42); and Z equals the number of markings on the outer body (42) traversed by one of the markings on the ring (46) as the ring (46) is screwed outwardly of the body (42).

21 Claims, 3 Drawing Sheets

ADJUSTABLE BEARING SPACER

FIELD OF THE INVENTION

This invention relates to an adjustable bearing spacer, and in particular, but not exclusively, to an adjustable bearing spacer for a hub.

BACKGROUND OF THE INVENTION

It is often desirable to fix the spacing between two bearings. For example, consider a hub of a heavy transport vehicle such as a truck or locomotive. The hub comprises a substantially cylindrical billet of metal having an axially extending hole through which an axle of the vehicle can pass. Opposite ends of the hole are machined to have an enlarged diameter to seat the cup of a tapered bearing. When assembling the hub and attaching it to the axle, the tapered bearing on the abutment side of the hub is packed with grease or lightly oiled and a lubricant seal placed adjacent to the tapered bearing. The hub is then slid over the axle and typically the remainder of the central hole filled with grease or other lubricant. The other tapered bearing is then packed with grease, placed into its cup and a bearing lock nut screwed onto a thread formed about the end of the axle to lock the hub onto the axle. It is however important that the lock nut not be over-tightened, nor be too loose. If the nut is over-tightened, the free rotation of the hub will be hampered and there will be excessive wear of the bearings. If however the lock nut is too loose, there may be excessive play in the hub and wheel and the seals about the bearings can work loose resulting in a loss or contamination of lubricant and accelerated wear of the bearings.

In order to avoid these problems, it is known in the prior art to pack the hole of the hub with a plurality of spacers and shims to fix the distance between the opposite tapered bearings. However this is a time consuming process. Also, the distance between the tapered bearings can only be adjusted in increments equivalent to the width, of the shims. The prior art methods of adjusting the spacing between the tapered bearings also requires the use of specialized measurement equipment which is expensive, can easily lose its accuracy if roughly handled, and requires considerable training in order to be used.

SUMMARY OF THE INVENTION

It is an object of the present invention to provide an adjustable bearing spacer which can provide continuous adjustment of the spacing between bearing of a hub.

According to the present invention there is provided an adjustable bearing spacer adapted for fitting into an axial hole formed in a hub, the hub having a seat at each end of said hole for seating first and second bearings respectively, the adjustable bearing spacer including:
  a first body having a first end for abutment with the first bearing; and,
  a second body having a first end for abutment with the second bearing, the second body threadingly engaged with the first body so as to be extendable from a second end of the first body to allow adjustment of the length of the spacer;
  whereby, in use, the bearings can be held at a desired distance apart by screwing one of the bodies relative to the other body to extend the length of the spacer to match the desired distance so that when the first and second bearings abut the first ends of the first and second bodies respectively, they are maintained apart by the desired distance.

According to another aspect of the present invention there is provided a hub of a wheel for a vehicle including:
  a hub body provided with an axially extending hole through which a vehicle axle can pass, the hub having first and second bearing seats at respective first and second ends of the hole;
  first and second bearings seated in the first and second seats respectively; and,
  a bearing spacer disposed in said hole and between the first and second bearings, the bearing spacer being configured to allow the vehicle axle to extend therethrough, the bearing spacer having a first body with a first end for abutment with the first bearing, and a second body with a first end for abutment with the second bearing, the second body threadingly engaging the first body so as to be extendable from a second end of the first body to allow adjustment of the length of the spacer;
  whereby, in use, the bearings can be held at a desired distance apart by screwing one of the bodies relative to the other body to extend the length of the spacer to match the desired distance so that when the first and second bearings abut the first ends of the first and second bodies respectively, they are maintained apart by the desired distance.

Preferably said spacer further includes releasable locking means for releasably locking first and second bodies together to fix the length of the spacer.

Preferably the releasable locking means comprises a socket set screw threadingly engaged in a circumferential wall of the first body and having one end which can be brought into contact with the second body by screwing down the socket set screw.

Preferably the second body has a threaded portion which threadingly engages the first body and an axially adjacent and inwardly disposed portion against which the socket set screw can bear to lock the second ring against rotation thereby fixing the length of the spacer.

Preferably the spacer is provided with an indexing scale to provide an indication of the length of extension of the second body from the first body, said indexing scale comprising a plurality of evenly spaced markings about the second end of the first body, and at least one marking on the second body, the length of extension being calculated as the reciprocal of the number of threads per inch on the second body multiplied by the reciprocal of the number markings on the first body, and multiplied by the number of markings on the first body traversed by the marking on the second body during screwing of the second body outwardly of the first body. (The metric measurement in millimetres is derived by simply multiplying the above calculated extension by 25.4.)

Preferably there is a plurality of markings on the second body that are spaced from each other by whole fractions of the angular distance between adjacent markings on the first body.

Preferably the first body is provided with at least one axially extending hole on the second end for the receipt of a prong of a tool to hold the first body.

Preferably the second body is also provided with at least one axially extending hole for the receipt of the prongs of a tool for holding the second body.

Preferably the holes on the first body coincide with adjacent markings on the first ring.

Preferably the holes on the second body coincide with one or adjacent markings on the second body.

Preferably the first body is in the form of a length of tubing having a screw thread formed on an inner circumferential surface thereof and the second body is in the form of a ring of a length less than the first body.

An embodiment of the present invention will now be described, by way of example only, with reference to the accompanying drawings in which:

DETAILED DESCRIPTION OF THE PREFERRED EMBODIMENT

Figure 1:
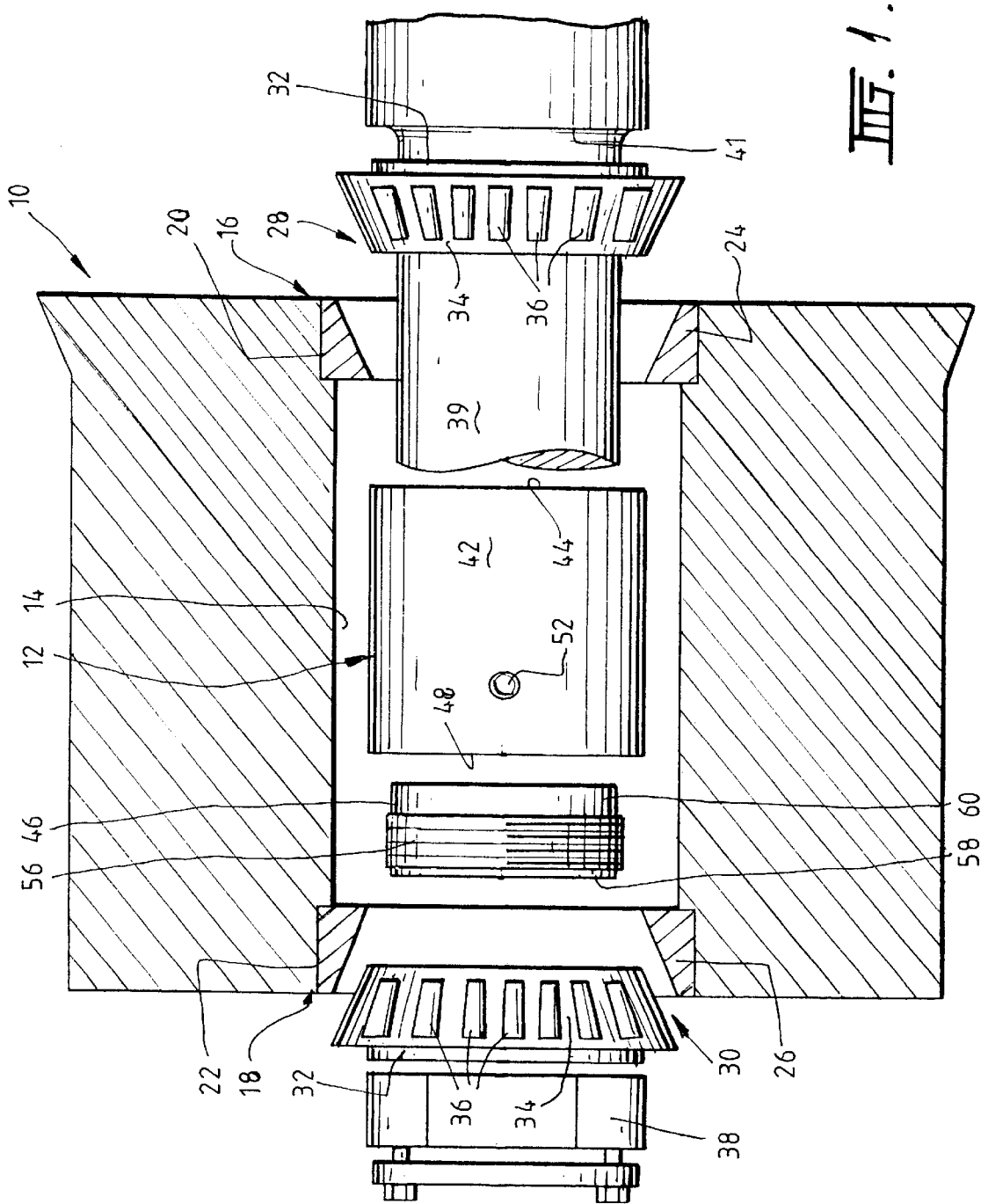
FIG. 1 is an exploded partial section view of a hub incorporating an embodiment of the adjustable hub bearing spacer.

FIG. 1 depicts a typical wheel hub 10 incorporating an embodiment of the spacer 12 in accordance with this invention. The hub 10 has a hub body in the form of a substantially cylindrical billet of metal provided with an axially extending hole 14. Opposite ends 16 and 18 of the hole 14 are formed of enlarged diameter to form seats 20 and 22 respectively. The seats 20 and 22 receive cups 24 and 26 respectively of tapered bearing assemblies 28 and 30. The cups 24 and 26 are interference fitted into the seats 20 and 22. The tapered bearing cones 28 and 30 are of conventional construction and each include an inner race 32, an outer cage 34 and a plurality of rollers 36 retained by the cage 34.

The hub assembly 10 when assembled is fitted over axle 39 so that the race 32 of bearing cone 28 abuts against an abutment 41 on the axle. In the absence of the spacer 12, the hub 10 is secured to the axle 39 by way of a lock nut 38 which engages a thread (not shown) at the free end of the axle 39. With the race 32 of cone 28 abutting against the abutment 41, the preload and running clearance of the bearing cones 28 and 30 is set by the degree of tightening of lock nut 38. If the lock nut 38 is done up too tightly, there will be a high preload on the bearing cones 28, 30 and no running clearance between the rollers 36 and respective cups 24 and 26. This increases the frictional forces acting within the hub 10 resulting in excessive wear to the bearings; excessive heat generation; and increased fuel consumption for the vehicle to which the hub 10 is fitted. If the lock nut 38 is too loose, there will be excessive play or clearance between the respective bearing cones and cups which can result in lubricant seals (not shown) working loose thus leading to a loss of lubricant; and, excessive lateral movement of the hub 10 on the axle 39 which can effect control of the vehicle and lead to excessive wear of tires, lubricant contaminating brake linings brake failure and bearing failure.

These problems arise because the distance between the bearing cones 28, 30 varies in the axial direction depending on the tightness of the lock nut 38. Further, the bearing cones 28, 30 are a slip fit onto axle 39 and can therefore turn in service and wear against the face of the abutment 41, and on the face of nut 38. Rotation of the bearing cones also damages the axle 39 outer circumference causing step type wear in the areas where they are seated on the axle. This wear creates metal contamination of the lubricant which in turn accelerates the deterioration of the bearing assembly components. This problem however is substantially overcome by the spacer 12 in accordance with embodiments of this invention.

The spacer 12 includes a first body in the form of a cylindrical outer body 42 having a first end 44 for abutment with the bearing cone 28 and second body in the form of an adjustable ring 46 for abutment with opposite bearing cone 30, the ring 46 being threadingly engaged with the outer body 42 to be extendable from a second end 48 of the body 42 to allow adjustment of length of the spacer 12.

Figure 2:
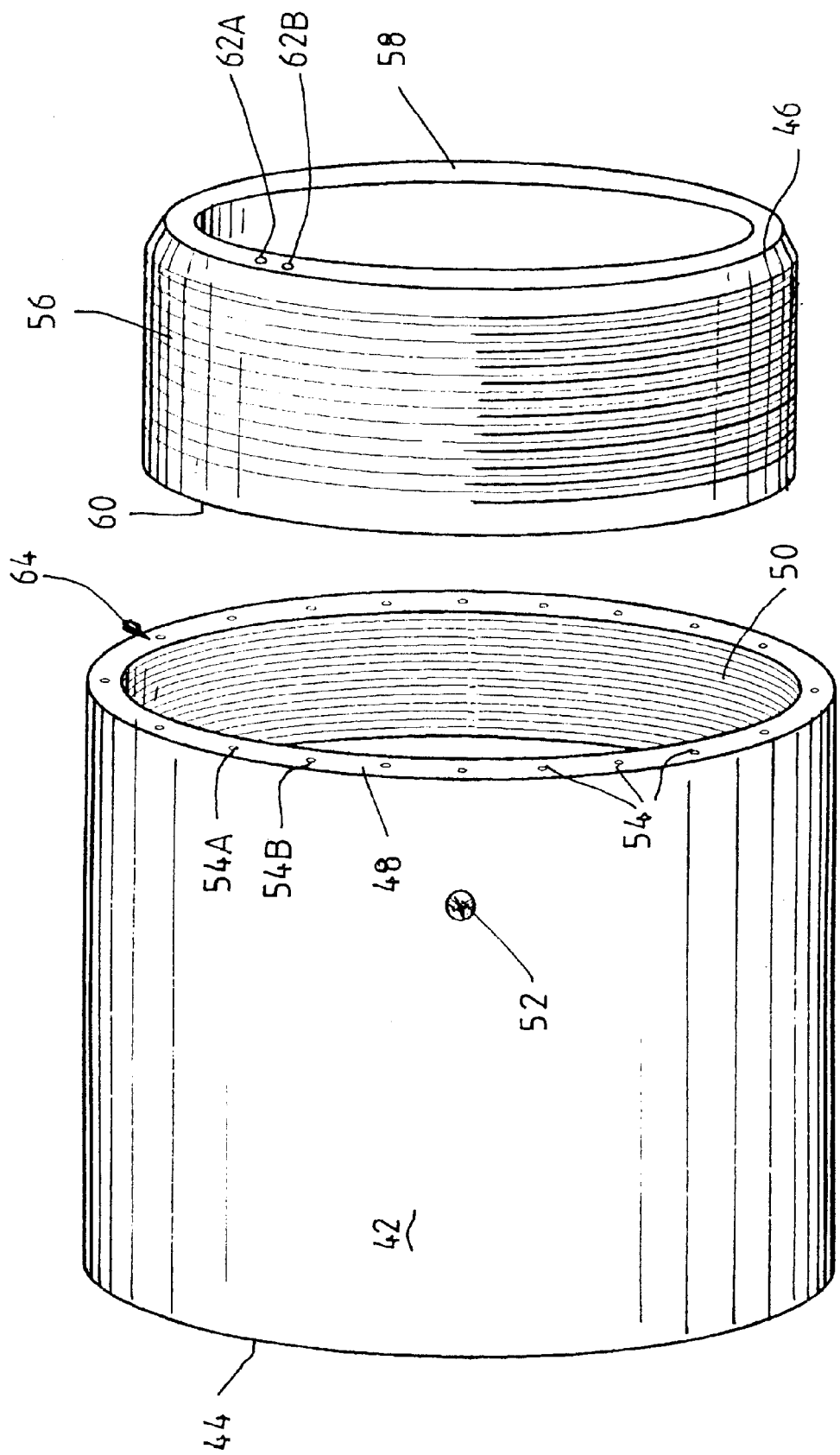
FIG. 2 is an isometric view of the adjustable hub bearing spacer in a disassembled state; and, FIG. 3 is an end view of the hub bearing spacer shown in FIGS. 1 and 2.
Figure 3:
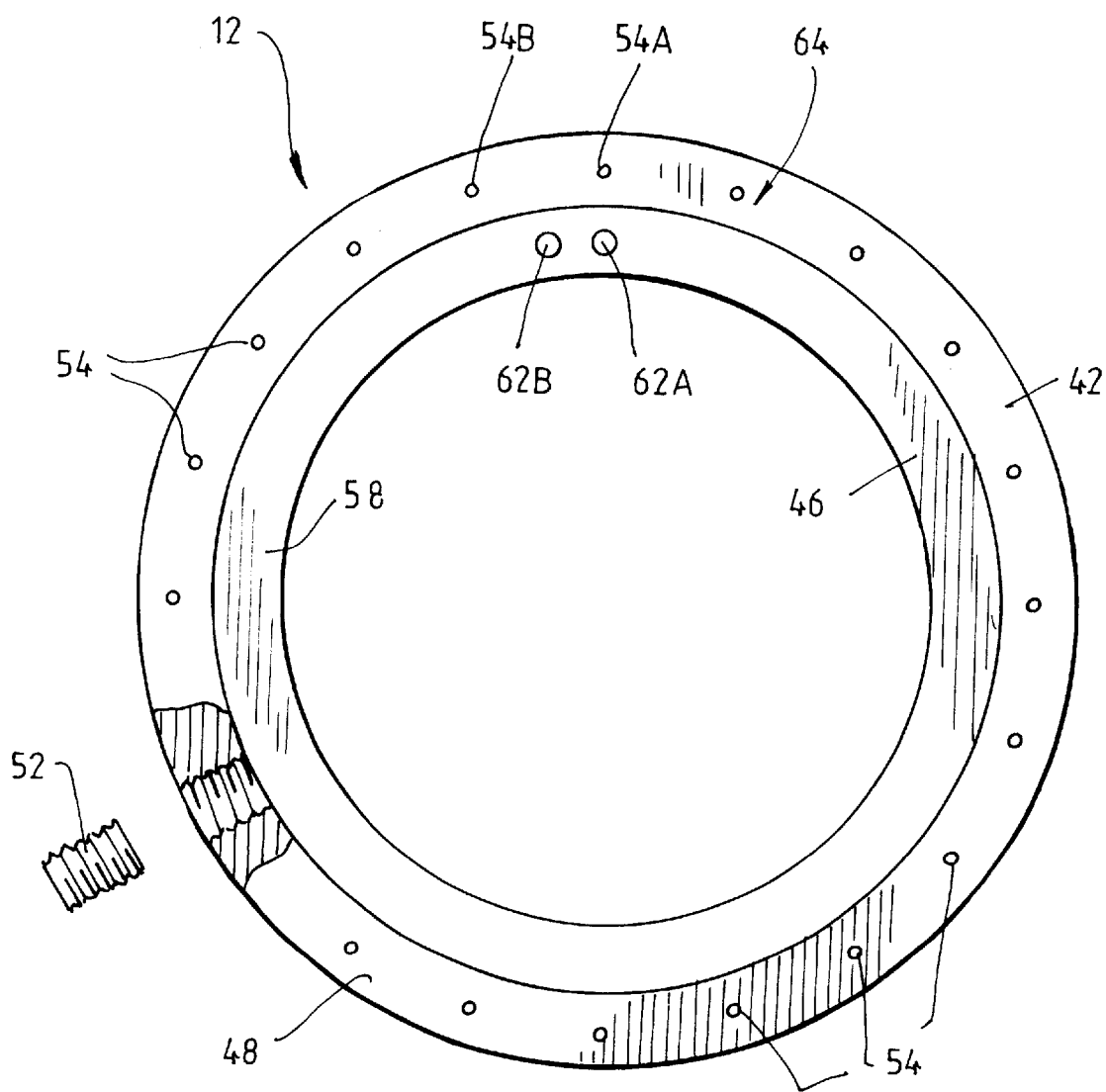

The body 42 is in the form of a open cylinder and is provided with a screw thread 50 on its inner circumferential surface adjacent the second end 48. A socket set screw 52 is threadingly engaged with and extends radially through the outer body 42 at a location near but inboard of the thread 50. The end 48 is provided with a plurality (in this instance 20) evenly spaced markings 54 (see FIGS. 2 and 3). The markings 54 can be formed either with an indelible marker or by physical scoring or punching the end 48 or any other suitable means. Two of the markings 54 designated as 54A and 54B are in the form of small holes drilled axially into the end 48, to hold, turn, or assist removal of spacer 12 from the hub 10.

The ring 46 is also in the form of a hollow cylinder and in this embodiment (but not necessarily) of a length less than that of the body 42 and of an outer diameter less than the inner diameter of body 42. A screw thread 56 corresponding to the thread 50 is formed along a portion of the length of the outer circumferential surface of ring 46. A remaining portion 60 of the ring is unthreaded and of a diameter less than the root diameter of the thread 56. End 58 of the ring which abuts the bearing cone 30 is also provided with two markings in the form of small axially extending holes 62A and 62B, into which a tool can be inserted to turn ring 46.

The length of the spacer 12 can be varied from a minimum equal to the length of body 42 which exists when the ring 46 is screwed fully into the body 42 so that end 58 is coplanar with end 48. From this position, the length of the spacer 12 can be increased by simply screwing the ring 46 out of the body 42. Ideally the length of the spacer 12 is adjusted to coincide with a desired spacing between the bearing cones 28 and 30. When this length is achieved, the socket set screw 52 is screwed down so as to bear against portion 60 and thereby lock the length of the spacer 12.

It will be appreciated that when this occurs, the distance between the bearing cones 28, 30 cannot change irrespective of the torque applied to the nut 38. The running clearance between the roller bearings 36 and respective cups 24 and 26 is also fixed. Therefore, the problems arising in the prior art due to over-tightening or undertightening of the nut 38 will no longer exist in a hub 10 incorporating a correctly set spacer 12 in accordance with the present invention.

The degree of extension in length of the spacer 12 can be determined by an indexing scale 64 formed by the markings 54i on the outer body 42 and marking 62A and 62B on the adjusting ring 46. The length of extension is the reciprocal of the number of threads per inch of threads 56 on the ring 46 (or of threads 50 in body 42) times the reciprocal of the number of markings 54i on the outer body 42, and multiplied by the number of markings 54 traversed by one of the markings 62A or 62B on the adjusting ring 46 as the adjusting ring 46 is screwed outwardly of the body 42. In mathematical terms, the degree of extension can be calculated as follows:

$$E'' = \frac{1}{X} \cdot \frac{Z}{Y}$$

where

X = the number of threads per inch on the ring 46 (or body 42)

Y = the number of markings 54 on the outer body 42

Z=the number of markings 54 traversed by one of the markings 62 as the ring 46 is screwed outwardly of the body 42.

For example, say there are 16 threads per inch, 20 markings 54 on the outer body 42 and that the ring 46 is screwed outwardly so that the marking 62A traverses the distance between adjacent markings 54. This results in an extension in length of the spacer 12 of 0.003 inches (or 0.08 millimetres). Accordingly, the length of the spacer 12 can be increased in increments of this length every time the marking 62A traverses another one of the markings 54.

The incremental extensions can be further refined by use of the second marking 62B. This marking is angularly spaced from marking 62A by a distance equal to one half of the angular spacing between adjacent markings 56. Therefore, in the present instance, the spacing between markings 62A and 62B is 9°. Thus if marking 62A is initially coincident with marking 54A and the ring 46 then screwed outwardly so that marking 62B is aligned with marking 54A, the extension is one half of that previously mentioned above. By placing further markings on the ring 46 (or on the body 46) the incremental extensions can be made even finer.

It will be appreciated that provided one knows what the incremental extension is, the extension obtained can be arrived at without the need for any specialized measurement tools.

Now that an embodiment of the invention has been described in detail, it will be apparent to those skilled in the relevant arts that numerous modifications and variations may be made without departing from the basic inventive concepts. For example, the body 42 need not necessarily be cylindrical in shape. The shape of the body 42 is in fact dictated by the requirements of the hub into which it is to be inserted. It is known that for some types of hubs, the body 42 would include a cylindrical portion and a contiguous frustum. Also, the inner circumferential surface of the body 42 may be provided with one or more steps to suit the axle 39 onto which the hub 10 is to be attached. Also, any suitable means other than the socket set screw 52 can be used to lock the ring 46 to the body 42. Further, embodiments of the bearing spacer 12 can be adopted for use in a planetary hub such as in earth moving equipment. Moreover, embodiments of the bearing spacer 12 can be used in any application where the spacing of bearings requires fixing, not only in the hubs of wheels. Additionally the ring 46 and body 42 may be formed so that the ring 46 threadingly engages about or on the outer circumferential surface of the body 42. Of course this will necessitate the ring 46 being formed with an inner diameter greater than the outer diameter of the body 42, and the threads 50 and 56 being provided on the opposite surfaces on which they appear in the embodiment shown in FIGS. 1–3. All such modifications and variations are deemed to be within the scope of the present invention, the nature of which is to be determined from the foregoing description and the appended claims.

What is claimed is:

1. An adjustable bearing spacer adapted for fitting into an axial hole formed in a hub, the hub having a seat at each end of said hole for seating first and second bearings respectively, the adjustable bearing spacer including:

a first body having a first end for abutment with the first bearing;

a second body having a first end for abutment with the second bearing, the second body threadingly engaged with the first body so as to be extendable from a second end of the first body to allow adjustment of the length of the spacer, and releasable locking means for releasably locking first and second bodies together to fix the length of the spacer, said releasable locking means comprising a socket set screw threadingly engaged in a circumferential wall of the first body and having one end which can be brought into contact with the second body by screwing down the socket set screw;

whereby, in use, the bearings can be held at a desired distance apart by screwing one of the bodies relative to the other body to extend the length of the spacer to match the desired distance and locked together by said socket set screw so that when the first and second bearings abut the first and second ends respectively, they are maintained apart by the desired distance.

2. A spacer according to claim 1 wherein the first body is in the form of a length of tubing having a screw thread formed on an inner circumferential surface thereof and the second body is in the form of an ring of a length less than the first body.

3. A spacer according to claim 1 wherein the second body has a threaded portion which threadingly engages the first body and an axially adjacent and inwardly disposed portion against which the socket set screw can bear to lock the second body against rotation thereby fixing the length of the spacer.

4. A spacer according to claim 1 wherein the spacer is provided with an indexing scale to provide an indication of the length of extension of the second body from the first body, said indexing scale comprising a plurality of evenly spaced markings about the second end of the first body, and at least one marking on the second body, the length of extension being calculated as the reciprocal of the number of threads per inch on the second body multiplied by the reciprocal of the number markings on the first body, and multiplied by the number of markings on the first body traversed by the marking on the second body during screwing of the second body outwardly of the first body. second body from the first body, said indexing scale comprising a plurality of evenly spaced markings about the second end of the first body, and at least one marking on the second body, the length of extension being calculated as the reciprocal of the number of threads per inch on the second body multiplied by the reciprocal of the number markings on the first body, and multiplied by the number of markings on the first body traversed by the marking on the second body during screwing of the second body outwardly of the first body.

5. A spacer according to claim 4 wherein there is a plurality of markings on the second body that are spaced from each other by whole fractions of the angular distance between adjacent markings on the first body.

6. A spacer according to claim 5 wherein the first body is provided with at least one axially extending hole on the second end for the receipt of a prong of a tool to hold the first body.

7. A spacer according to claim 6 wherein the second body is also provided with at least one axially extending hole for the receipt of the prongs of a tool for holding the second body.

8. A spacer according to claim 7 wherein the holes on the first body coincide with adjacent markings on the first body.

9. A spacer according to claim 8 wherein the holes on the second body coincide with one or adjacent markings on the second body.

10. A hub of a wheel for a vehicle including:

a hub body provided with an axially extending hole through which a vehicle axle can pass, the hub having first and second bearing seats at respective first and second ends of the hole;

first and second bearings seated in the first and second seats respectively;

a bearing spacer disposed in said hole and between the first and second bearings, the bearing spacer being configured to allow the vehicle axle to extend therethrough, the bearing spacer having a first body with a first end for abutment with the first bearing, and a second body with a first end for abutment with the second bearing, the second body threadingly engaging the first body so as to be extendable from a second end of the first body to allow adjustment of the length of the spacer; and, releasable locking means for releasably locking first and second bodies together to fix the length of the spacer, said releasable locking means comprising a socket set screw threadingly engaged in a circumferential wall of the first body and having one end which can be brought into contact with the second body by screwing down the socket set screw;

whereby, in use, the bearings can be held at a desired distance apart by screwing one of the bodies relative to the other body to extend the length of the spacer to match the desired distance and locked together by said socket set screw so that when the first and second bearings abut the first and second ends respectively, they are maintained apart by the desired distance.

11. An adjustable bearing spacer adapted for fitting into an axial hole formed in a hub, the hub having a scat at each end of said hole for seating first and second bearings respectively, the adjustable bearing spacer including:

a first body having a first end for abutment with a first bearing;

a second body having a first end for abutment with the second bearing, the second body threadingly engaged with the first body so as to be extendable from a second end of the first body to allow adjustment of the length of the spacer, and, an indexing scale to provide an indication of the length of extension of the second body from the first body, said indexing scale comprising a plurality of evenly spaced markings about the second end of the first body, and at least one marking on the second body, the length of extension being calculated as the reciprocal of the number of threads per inch on the second body multiplied by the reciprocal of the number markings on the first body, and multiplied by the number of markings on the first body traversed by the marking on the second body during screwing of the second body outwardly of the first body;

whereby, in use, the bearings can be held at a desired distance apart by screwing one of the bodies relative to the other body to extend the length of the spacer to match the desired distance and locked together by said socket set screw so that when the first and second bearings abut the first and second ends respectively, they are maintained apart by the desired distance.

12. A spacer according to claim 11 wherein the first body is in the form of a length of tubing having a screw thread formed on an inner circumferential surface thereof and the second body is in the form of an ring of a length less than the first body.

13. A spacer according to claim 11 further including releasable locking means for releasably locking first and second bodies together to fix the length of the spacer.

14. A spacer according to claim 13 wherein the releasable locking means comprising a socket set screw threadingly engaged in a circumferential wall of the first body and having one end which can be brought into contact with the second body by screwing down the socket set screw.

15. A spacer according to claim 14 wherein the second body has a threaded portion which threadingly engages the first body and an axially adjacent and inwardly disposed portion against which the socket set screw can bear to lock the second ring against rotation thereby fixing the length of the spacer.

16. A spacer according to claim 11 wherein there is a plurality of markings on the second body that are spaced from each other by whole fractions of the angular distance between adjacent markings on the first body.

17. A spacer according to claim 16 wherein the first body is provided with at least one axially extending hole on the second end for the receipt of a prong of a tool to hold the first body.

18. A spacer according to claim 17 wherein the second body is also provided with at least one axially extending hole for the receipt of the prongs of a tool for holding the second body.

19. A spacer according to claim 18 wherein the holes on the first body coincide with adjacent markings on the first body.

20. A spacer according to claim 19 wherein the holes on the second body coincide with one or adjacent markings on the second body.

21. A hub of a wheel for a vehicle including:

a hub body provided with an axially extending hole through which a vehicle axle can pass;

first and second bearings respectively seated at first and second ends of the axially extending hole; and, an indexing scale to provide an indication of the length of extension of the second body from the first body, said indexing scale comprising a plurality of evenly spaced markings about the second end of the first body, and at least one marking on the second body, the length of extension being calculated as the reciprocal of the number of threads per inch on the second body multiplied by the reciprocal of the number markings on the first body, and multiplied by the number of markings on the first body traversed by the marking on the second body during screwing of the second body outwardly of the first body;

whereby, in use, the bearings can be held at a desired distance apart by screwing one of the bodies relative to the other body to extend the length of the spacer to match the desired distance so that when the first and second bearings abut the first and second ends respectively, they are maintained apart by the desired distance.

* * * * *

UNITED STATES PATENT AND TRADEMARK OFFICE
CERTIFICATE OF CORRECTION

PATENT NO. : 6,312,162 B1  Page 1 of 1
DATED : November 6, 2001
INVENTOR(S) : Noel Castle It is certified that error appears in the above-identified patent and that said Letters Patent is hereby corrected as shown below:

Title page,
Inventor, "WA(US) 06171" should be -- W.A. (AU) 6171 --.

Column 1,
Line 37, "width," should be -- width --.

Column 6,
Lines 36-45, delete section beginning with second occurrence of "second" and ending with "first body".

Column 7,
Line 28, "scat" should be -- seat --.

Signed and Sealed this

Twenty-third Day of April, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO. : 6,312,162 B1
DATED : November 6, 2001
INVENTOR(S) : Noel Castle

It is certified that error appears in the above-identified patent and that said Letters Patent is hereby corrected as shown below:

Title page,
Under Inventor, "WA (US) 06171" should be -- W.A. (AU) 6171 --.

Column 1,
Line 37, "width," should be -- width --.

Column 6,
Lines 36-45, delete section beginning with second occurrence of "second" and ending with "first body".

Column 7,
Line 28, "scat" should be -- seat --.

Signed and Sealed this

Thirtieth Day of April, 2002

Attest:

*Attesting Officer*

JAMES E. ROGAN
*Director of the United States Patent and Trademark Office*